US008224395B2

(12) United States Patent
Moller et al.

(10) Patent No.: US 8,224,395 B2
(45) Date of Patent: Jul. 17, 2012

(54) AUDITORY SPACING OF SOUND SOURCES BASED ON GEOGRAPHIC LOCATIONS OF THE SOUND SOURCES OR USER PLACEMENT

(75) Inventors: Ted Moller, Helsingborg (SE); Ian Rattigan, Malmö (SE)

(73) Assignee: Sony Mobile Communications AB, Lund (SE)

( * ) Notice: Subject to any disclaimer, the term of this patent is extended or adjusted under 35 U.S.C. 154(b) by 518 days.

(21) Appl. No.: 12/429,720

(22) Filed: Apr. 24, 2009

(65) Prior Publication Data
US 2010/0273505 A1 Oct. 28, 2010

(51) Int. Cl.
H04W 24/00 (2009.01)
G10L 17/00 (2006.01)
G06K 9/00 (2006.01)
H04N 17/00 (2006.01)
H04M 7/00 (2006.01)

(52) U.S. Cl. ............ 455/569.1; 704/246; 704/E15.001; 382/103; 348/179; 379/202.01

(58) Field of Classification Search ............... 455/456.1; 704/246, E15.001
See application file for complete search history.

(56) References Cited

U.S. PATENT DOCUMENTS
6,850,496 B1 2/2005 Knappe et al.
2006/0008117 A1* 1/2006 Kanada .......................... 382/103
2007/0263823 A1* 11/2007 Jalava et al. ............ 379/202.01
2008/0298610 A1 12/2008 Virolainen et al.
2009/0029686 A1* 1/2009 Miller et al. ............... 455/414.1
2009/0080632 A1* 3/2009 Zhang et al. ............. 379/202.01
2009/0112589 A1* 4/2009 Hiselius et al. ............... 704/246

FOREIGN PATENT DOCUMENTS
EP 1 515 570 A1 3/2005
JP 2000-184017 A 6/2000
JP 2004-336292 A 11/2004
JP 2008-160397 A 7/2008
WO WO 2008/036950 A2 3/2008
WO WO 2009/056922 A1 5/2009

OTHER PUBLICATIONS
International Preliminary Report on Patentability; Apr. 4, 2011; issued in International Patent Application No. PCT/IB2009/054013.
Notification of Transmittal of the International Search Report and the Written Opinion of the International Searching Authority, or the Declaration, corresponding to PCT/IB2009/054013, mailed Feb. 19, 2010, 13 pages.

* cited by examiner

Primary Examiner — Dwayne Bost
Assistant Examiner — Timothy Pham
(74) Attorney, Agent, or Firm — Patrick B. Horne; Moore & Van Allen, PLLC

(57) ABSTRACT

A method may include connecting to another user device, identifying a geographic location of the other user device, identifying a geographic location of the user device, mapping a sound source associated with the other user device, based on the geographic location of the other user device with respect to the geographic location of the user device, to a location of an auditory space associated with a user of the user device, placing the sound source in the location of the auditory space, and emitting, based on the placing, the sound source so that the sound source is capable of being perceived by the user in the location of the auditory space.

18 Claims, 13 Drawing Sheets

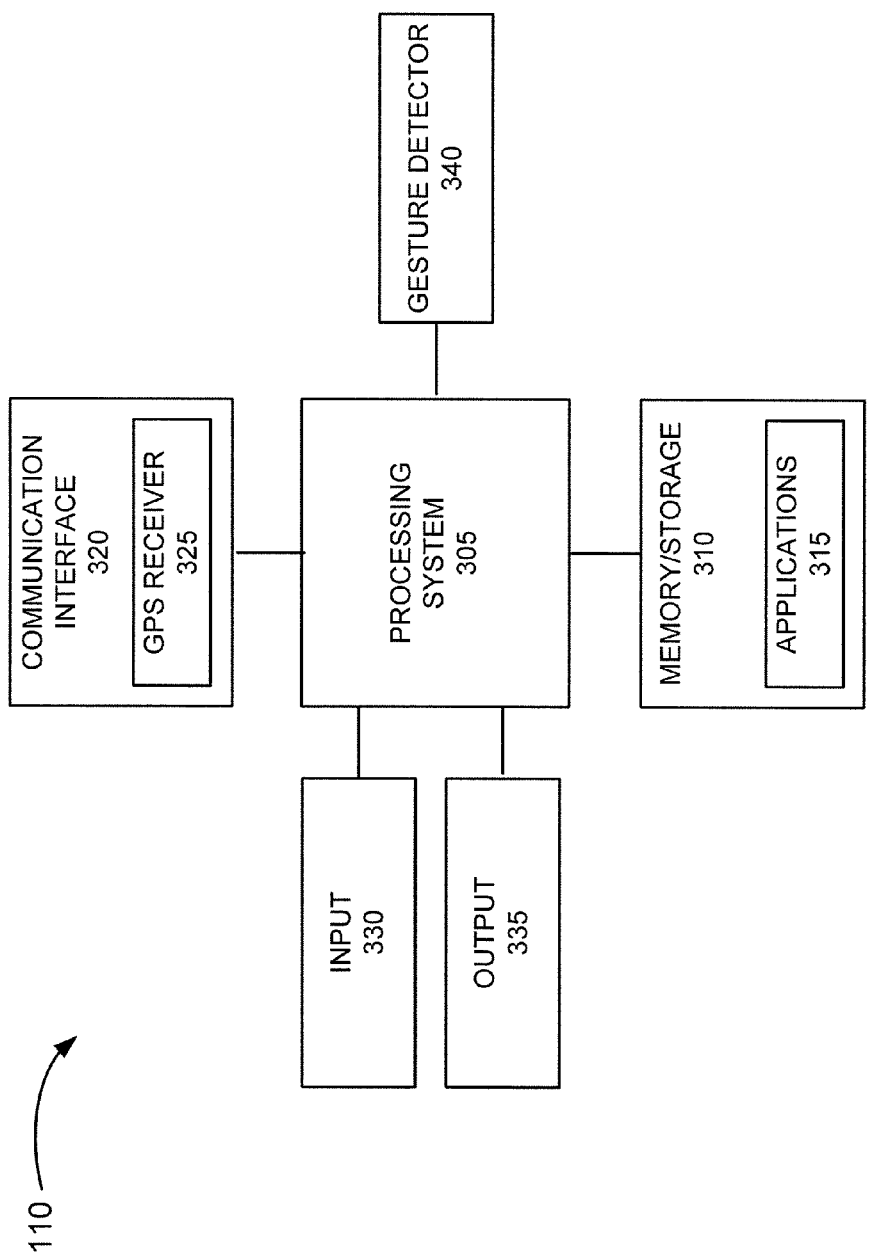

AUDITORY SPACING OF SOUND SOURCES BASED ON GEOGRAPHIC LOCATIONS OF THE SOUND SOURCES OR USER PLACEMENT

BACKGROUND

With the development of consumer devices, such as mobile phones and personal digital assistants (PDAs), users are afforded an expansive platform to access and exchange information. In turn, users' reliance on such devices has comparatively grown in both personal and business settings.

It is not uncommon for the user to utilize a hands-free device when operating the consumer device. The hands-free device may include multiple ear-pieces for listening to music or a conversation. Additionally, the hands-free device may include a mouthpiece or microphone for speaking.

SUMMARY

According to one aspect, a method may include connecting to another user device, identifying a geographic location of the other user device, identifying a geographic location of the user device, mapping a sound source associated with the other user device, based on the geographic location of the other user device with respect to the geographic location of the user device, to a location of an auditory space associated with a user of the user device, placing the sound source in the location of the auditory space, and emitting, based on the placing, the sound source so that the sound source is capable of being perceived by the user in the location of the auditory space.

Additionally, the sound source may include another user's voice associated with the other user device.

Additionally, the method may further include mapping the geographic location of the other user device to a first location of a location space, mapping the geographic location of the user device to a second location of the location space, and mapping the sound source associated with the other user device, to the location in the auditory space, based on the second location of the location space with respect to the first location of the location space.

Additionally, the placing may include selecting values related to one or more of a phase or an amplitude of the sound source to place the sound source in the location of the auditory space.

Additionally, the identifying the geographic location of the other user may include identifying a telephone number associated with the other user device, and identifying the geographic location of the other user device based on the telephone number.

Additionally, the method may include receiving a user input that modifies the location of the auditory space.

Additionally, the receiving may include receiving the user input based on a pointing of the user device in a direction that corresponds to the location of the auditory space.

According to another aspect, a user device may connect to other users associated with other user devices, distinguish the other users based on voice recognition, receive a user selection of locations of an auditory space, associated with a user of the user device, for each of the other users, place the voices of the other users in the selected locations of the auditory space, and emit the voices of the other users via speakers based on the selected locations of the auditory space.

Additionally, the user device may include a wireless telephone.

Additionally, the user device may further one of: move the selected locations of the auditory space to a direction in which the user device is facing, or not move the selected locations of the auditory space regardless of the direction in which the user device is facing.

Additionally, the user device may connect to a headset that includes the speakers, and emit the voices of the other users via the speakers of the headset.

Additionally, where the user selection may be based on a pointing of the user device in a direction that corresponds to the locations of the auditory space.

According to yet another aspect, a user device may connect with one or more other user devices, identify one or more geographic locations of the one or more other user devices, identify a geographic location of the user device, map each sound source associated with the one or more other user devices, based on the one or more geographic locations of the one or more other user devices and the geographic location of the user device, to one or more locations of an auditory space associated with a user of the user device, place each sound source in the one or more locations of the auditory space, and emit each sound source, via speakers, so that each sound source is capable of being perceived by the user in the one or more locations of the auditory space.

Additionally, the user device may map the one or more geographic locations of the one or more other user devices to one or more locations in a location space, map the geographic location of the user device to a location of the location space, and map each sound source associated with the one or more other user devices, to the one or more locations of the auditory space, based on the one or more locations of the location space.

Additionally, the user device may connect with the one or more other user devices by placing a telephone call to the one or more other user devices, or by receiving a telephone call from the one or more other user devices.

Additionally, the user device may further modify the one or more locations of the auditory space based one or more user selections that select one or more different locations of the auditory space.

Additionally, the user device may identify a direction in which the user is facing, and map each sound source associated with the one or more other user devices based on the direction in which the user is facing.

Additionally, the user device may include a wireless telephone.

Additionally, the user device may select values related to one or more of a phase or an amplitude associated with each sound source to place each sound source in the one or more locations of the auditory space.

Additionally, each sound source may include voices associated with the one or more other user devices.

BRIEF DESCRIPTION OF THE DRAWINGS

The accompanying drawings, which are incorporated in and constitutes a part of this specification, illustrate exemplary embodiments described herein and, together with the description, explain these exemplary embodiments. In the drawings:

FIG. 3 is a diagram illustrating exemplary components of the user device depicted in FIG. 2;

DETAILED DESCRIPTION

The following detailed description refers to the accompanying drawings. The same reference numbers in different drawings may identify the same or similar elements. Also, the following description does not limit the invention.

The term "auditory space," as used herein, is intended to be broadly interpreted to include a space in which a user perceives (e.g., hears) sound. The auditory space may correspond to a one, two, or three dimensional space.

The term "sound source," as used herein, is intended to be broadly interpreted to include a source that creates or generates sound. For example, a sound source may be a user (e.g., who is speaking) or music (e.g., that is playing). As will be described herein, one or multiple sound sources may be localized within the auditory space. For example, a phantom image(s), which corresponds to a sound image(s), may be created in the auditory space.

Overview

Embodiments described herein relate to an auditory placement scheme based on either a location of a sound source or a placement selection by a user. In one embodiment, a user device may identify a location of another user, such as, for example, by a global positioning system (GPS), triangulation, or the like. The user device may map the other user's location to an auditory space. The mapping of the other user's location in the auditory space may be based on the location of the other user, from the perspective of the user of the user device (i.e., a location of the user). The user of the user device may listen to the other user (e.g., in a telephone conversation), such that the user hears the other user in a location within the auditory space that corresponds to the location of the other user. In one implementation, the user device may have speakers to emit the corresponding auditory spatial sound to the user. In another implementation, a headset may be connected to the user device to emit the corresponding auditory spatial sound to the user.

In another embodiment, the user may select a location in the auditory space by using a selection mechanism provided by the user device. Similarly, the user device may have speakers or the user device may be connected to the headset to emit the corresponding auditory spatial sound. In both embodiments, the auditory space may include more than one sound source (e.g., more than one other user).

Figure 1A:
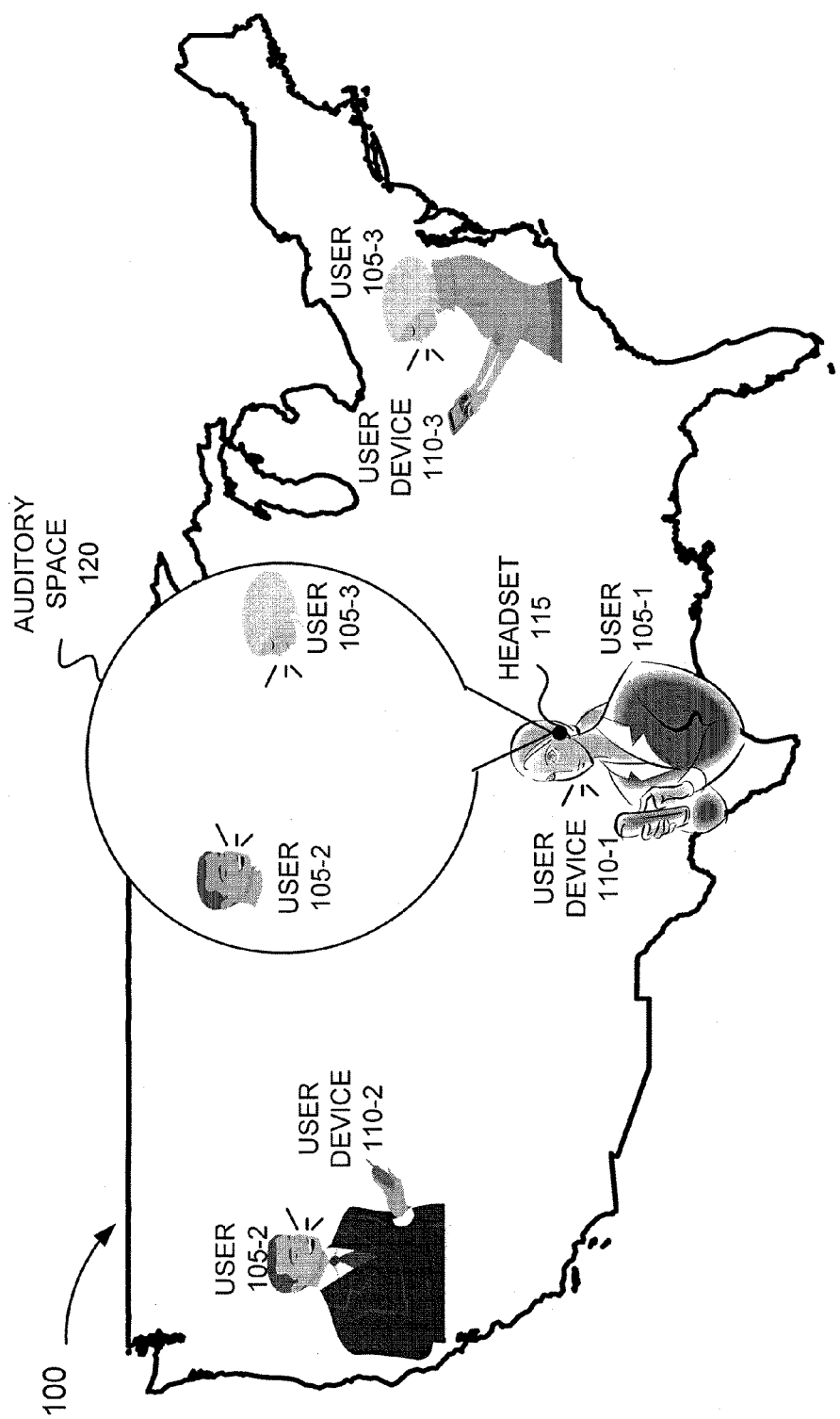
FIG. 1A is a diagram illustrating an overview of an exemplary embodiment described herein.

FIG. 1A is a diagram illustrating an overview of an exemplary embodiment described herein. As illustrated, environment 100 may include users 105-1, 105-2, and 105-3 (referred to generally as "user 105") operating user devices 110-1, 110-2, and 110-3 (referred to generally as "user device 110"), respectively. User 105-1 may also be wearing a (wireless or wired) headset 115. For purposes of discussion, users 105-1, 105-2, and 105-3 are illustrated on an outline of the United States to designate exemplary locations in the United States. For example, assume that user 105-1 is located in the state of Texas, user 105-2 is located in the state of California, and user 105-3 is located in the state of Virginia.

In an exemplary scenario, assume that user 105-1 calls users 105-2 and 105-3. User device 110-1 may determine or obtain the geographic locations of users 105-2 and 105-3. User device 110-1 may map the locations of users 105-2 and 105-3 to an auditory space 120, as illustrated in FIG. 1A. User 105-1 may converse with users 105-2 and 105-3 and hear each of users 105-2 and 105-3 based on a mapping of the geographic locations of users 105-2 and 105-3 to corresponding locations in auditory space 120.

Figure 1B:
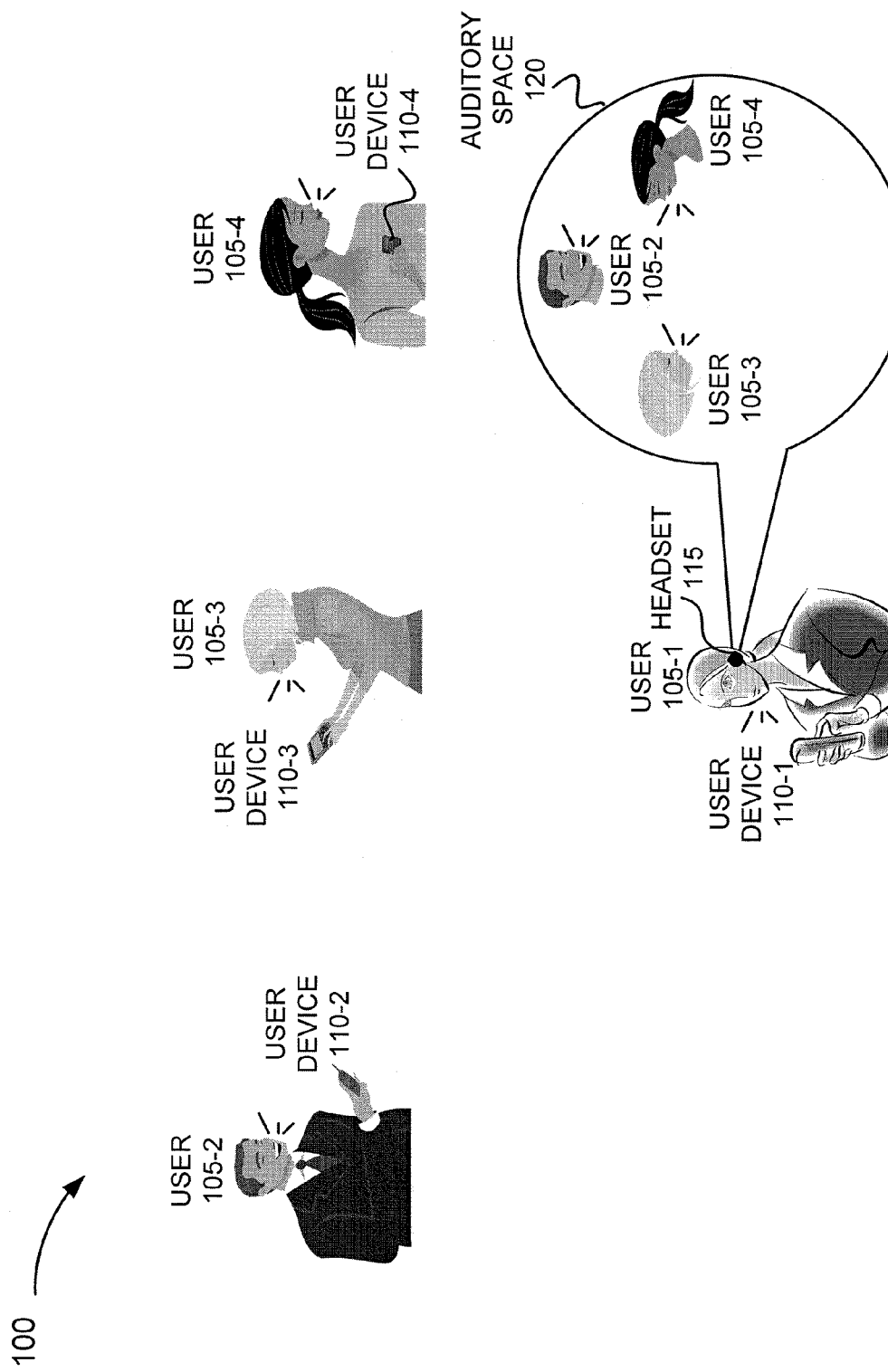
FIG. 1B is a diagram illustrating an overview of another exemplary embodiment described herein.

FIG. 1B is a diagram illustrating an overview of another exemplary embodiment described herein. As illustrated, environment 100 may include users 105-1, 105-2, 105-3, and 105-4 that operate user devices 110-1, 110-2, 110-3, and 110-4, respectively. User 105-1 may also be wearing headset 115.

In an exemplary scenario, assume that users 105-1, 105-2, 105-3, and 105-4 are conducting a conference call. User 105-1 would like to place each of users 105-2, 105-3, and 105-4 in a location in auditory space 120. In one implementation, when users 105-2, 105-3, and 105-4 are in distinguishable geographic locations, user device 110-1 may place each of users 105-2, 105-3, and 105-4 in a location in auditory space 120 that corresponds to their respective geographic locations. User device 110-1 may then permit user 105-1 to modify their location in auditory space 120. Additionally, or alternatively, in another implementation, user device 110-1 may distinguish each of users 105-2, 105-3, and 105-4, whether they are in the same geographic location or not, based on voice recognition. User device 110-1 may then permit user 105-1 to place each of users 105-2, 105-3, and 105-4 in a location in auditory space 120.

As a result of the foregoing, the user's auditory experience may more realistically mimic a location from which a sound source emanates and, in turn, may correspondingly be heard. Additionally, the user's auditory experience may be significantly improved by permitting the user to selectively place sound sources in distinct locations in the user's auditory space. For example, the user may be able to isolate various sound sources more readily by placing the sound sources in different locations within the user's auditory space. The embodiments described herein have been broadly described with respect to FIGS. 1A and 1B. Accordingly, a detailed description and variations to these embodiments are provided below.

Exemplary Device

Figure 2:
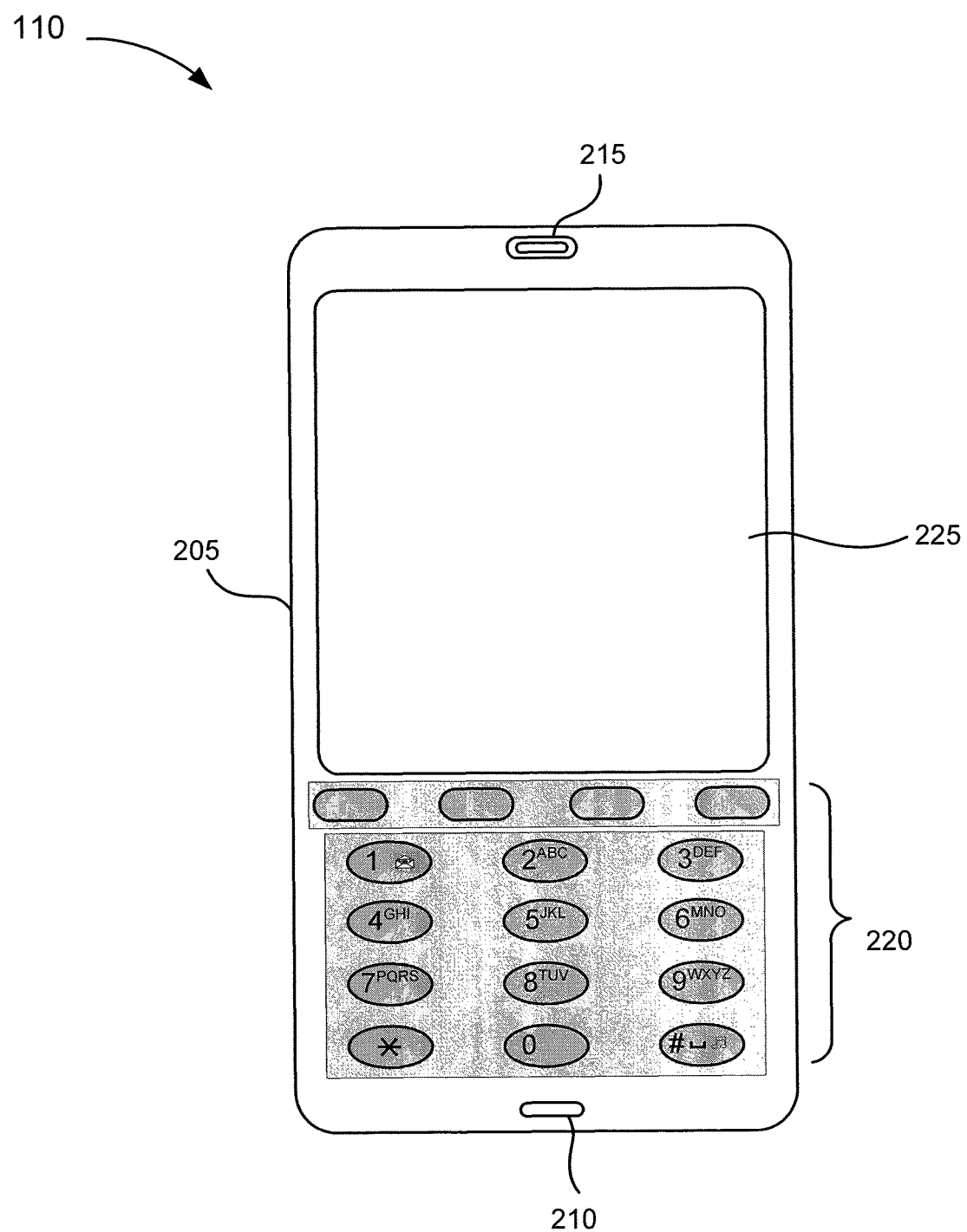
FIG. 2 is a diagram illustrating an exemplary user device in which the embodiments described herein may be implemented.

FIG. 2 is a diagram of an exemplary user device 110 in which the embodiments described herein may be implemented. The term "user device," as used herein, is intended to be broadly interpreted to include a variety of communication devices. For example, user device 110 may include a portable device, a mobile device, or a handheld device, such as a wireless telephone (e.g., a smart phone or a cellular phone), a PDA, a pervasive computing device, a computer, or another kind of communication device. User device 110 may also include a stationary device. For example, user device 110 may include a telephone or a computer.

As illustrated in FIG. 2, user device 110 may include a housing 205, a microphone 210, a speaker 215, a keypad 220, and a display 225. In other embodiments, user device 110 may include fewer, additional, and/or different components, or a different arrangement of components than those illustrated in FIG. 2 and described herein. For example, user device 110 may include a camera, a video capturing component, and/or a flash for capturing images and/or video.

Housing 205 may include a structure to contain components of user device 110. For example, housing 205 may be formed from plastic, metal, or some other material. Housing 205 may support microphone 210, speaker 215, keypad 220, and display 225.

Microphone 210 may transduce a sound wave to a corresponding electrical signal. For example, a user may speak into microphone 210 during a telephone call or to execute a voice command. Speaker 215 may transduce an electrical signal to a corresponding sound wave. For example, a user may listen to music or listen to a calling party through speaker 215. Speaker 215 may include multiple speakers. For example, user device 110 may include two speakers. In other implementations, user device 110 may include more than two speakers. Further, depending on user device 110, speakers 215 may be peripheral devices. For example, a desktop computer may be connected to more than two speakers positioned in various locations in a room. In this regard, the available locations in auditory space 120 may depend on the number of speakers and their positions relative to user 105.

Keypad 220 may provide input to user device 110. Keypad 220 may include a standard telephone keypad, a QWERTY keypad, and/or some other type of keypad. Keypad 220 may also include one or more special purpose keys. In one implementation, each key of keypad 220 may be, for example, a pushbutton. A user may utilize keypad 220 for entering information, such as text, or for activating a special function.

Display 225 may output visual content and may operate as an input component (e.g., a touch screen). For example, display 225 may include a liquid crystal display (LCD), a plasma display panel (PDP), a field emission display (FED), a thin film transistor (TFT) display, or some other type of display technology. Display 225 may display, for example, text, images, and/or video to a user.

In one implementation, display 225 may include a touch-sensitive screen. Display 225 may correspond to a single-point input device (e.g., capable of sensing a single touch) or a multipoint input device (e.g., capable of sensing multiple touches that occur at the same time). Display 225 may implement, for example, a variety of sensing technologies, including but not limited to, capacitive sensing, surface acoustic wave sensing, resistive sensing, optical sensing, pressure sensing, infrared sensing, etc. Display 225 may display various images (e.g., icons, a keypad, etc.) that may be selected by a user to access various applications and/or enter data. Display 225 may also include an auto-rotating function. Display 225 may serve as a viewfinder when user device 110 includes a camera or a video capturing component.

FIG. 3 is a diagram illustrating exemplary components of user device 110. As illustrated, user device 110 may include a processing system 305, a memory/storage 310 (e.g., containing applications 315), a communication interface 320, a GPS receiver 325, an input 330, an output 335, and a gesture detector 340. In other embodiments, user device 110 may include fewer, additional, and/or different components, or a different arrangement of components than those illustrated in FIG. 3 and described herein.

Processing system 305 may include one or multiple processors, microprocessors, data processors, co-processors, network processors, application specific integrated circuits (ASICs), controllers, programmable logic devices, chipsets, field programmable gate arrays (FPGAs), and/or some other component that may interpret and/or execute instructions and/or data. Processing system 305 may control the overall operation (or a portion thereof) of user device 110 based on an operating system and/or various applications.

Processing system 305 may access instructions from memory/storage 310, from other components of user device 110, and/or from a source external to user device 110 (e.g., a network or another device). Processing system 305 may provide for different operational modes associated with user device 110. Additionally, processing system 305 may operate in multiple operational modes simultaneously. For example, processing system 305 may operate in a camera mode, a music playing mode, a radio mode (e.g., an amplitude modulation/frequency modulation (AM/FM) mode), and/or a telephone mode.

Memory/storage 310 may include memory and/or secondary storage. For example, memory/storage 310 may include a random access memory (RAM), a dynamic random access memory (DRAM), a read only memory (ROM), a programmable read only memory (PROM), a flash memory, and/or some other type of memory. Memory/storage 310 may include a hard disk (e.g., a magnetic disk, an optical disk, a magneto-optic disk, etc.) or some other type of computer-readable medium, along with a corresponding drive. The term "computer-readable medium," as used herein, is intended to be broadly interpreted to include a memory, a secondary storage, a compact disc (CD), a digital versatile disc (DVD), or the like.

Memory/storage 310 may store data, application(s), and/or instructions related to the operation of user device 110. For example, memory/storage 310 may include a variety of applications 315, such as, an e-mail application, a telephone application, a camera application, a voice recognition application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.). Memory/storage 310 may also store a database (not illustrated) that includes associations between portions of telephone numbers and geographic locations, as will be described in greater detail below.

Communication interface 320 may permit user device 110 to communicate with other devices, networks, and/or systems. For example, communication interface 320 may include an Ethernet interface, a radio interface, a microwave interface, or some other type of wireless and/or wired interface.

GPS receiver 325 may include an antenna/receiver to receive signals (e.g., GPS satellite broadcasts or other forms of positional signals). It will be appreciated that a variety of technologies or techniques (e.g., GPS, cellular positioning methods (e.g., triangulation, etc.), local positioning methods (e.g., Bluetooth, IEEE 802.11, Ultra Wide Band, etc.)) exist to identify a geographic location associated with the user or the user device. However, these technologies may provide the user's geographic location or the geographic location of the user device with different degrees of precision and/or accuracy.

While the GPS is a popular technology that enables the user or the user device to obtain geographic location information, the GPS typically does not work well inside buildings or underground due to the absence of line of sight to satellites and attenuation and scattering of signals caused by roofs, walls, and other objects. In this regard, other technologies, such as, for example, an indoor positioning system (IPS) or triangulation may be utilized. Thus, while the description that follows may describe embodiments that utilize the GPS, it will be appreciated that other technologies or techniques may be utilized to obtain the geographic location of the user or the user device. For example, as will be described herein, geographic location information may be obtained or inferred based on a telephone number associated with the user device. Additionally, or alternatively, geographic location information may be obtained from an on-line service (e.g., Google Maps, etc.) that provides a location of the user device. Typically, with these services, a user may give permission to other users to see where the user is located.

Input 330 may permit a user and/or another device to input information to user device 110. For example, input 330 may include a keyboard, keypad 220, display 225, a touchpad, a mouse, a button, a switch, microphone 210, an input port, voice recognition logic, and/or some other type of input component. Output 335 may permit user device 110 to output information to a user and/or another device. For example, output 335 may include display 225, speaker 215, one or more light emitting diodes (LEDs), an output port, a vibrator, and/or some other type of visual, auditory, tactile, etc., output component.

Gesture detector 340 may detect a user's gestures with user device 110. Gesture detector 340 may include one or more gyroscopes for measuring and/or determining an orientation of user device 110, and/or other types of gesture-based detectors (e.g., in-air gesture technology). Gesture detector 340 may also include an accelerometer to measure speed and/or path information caused by the movement of user device 110. Additionally, gesture detector 340 may include a compass to identify a direction in which user 105 or user device 110 is facing. Gesture detector 340 may also be operatively coupled to GPS receiver 325 to obtain geographic location information.

Figure 4A:
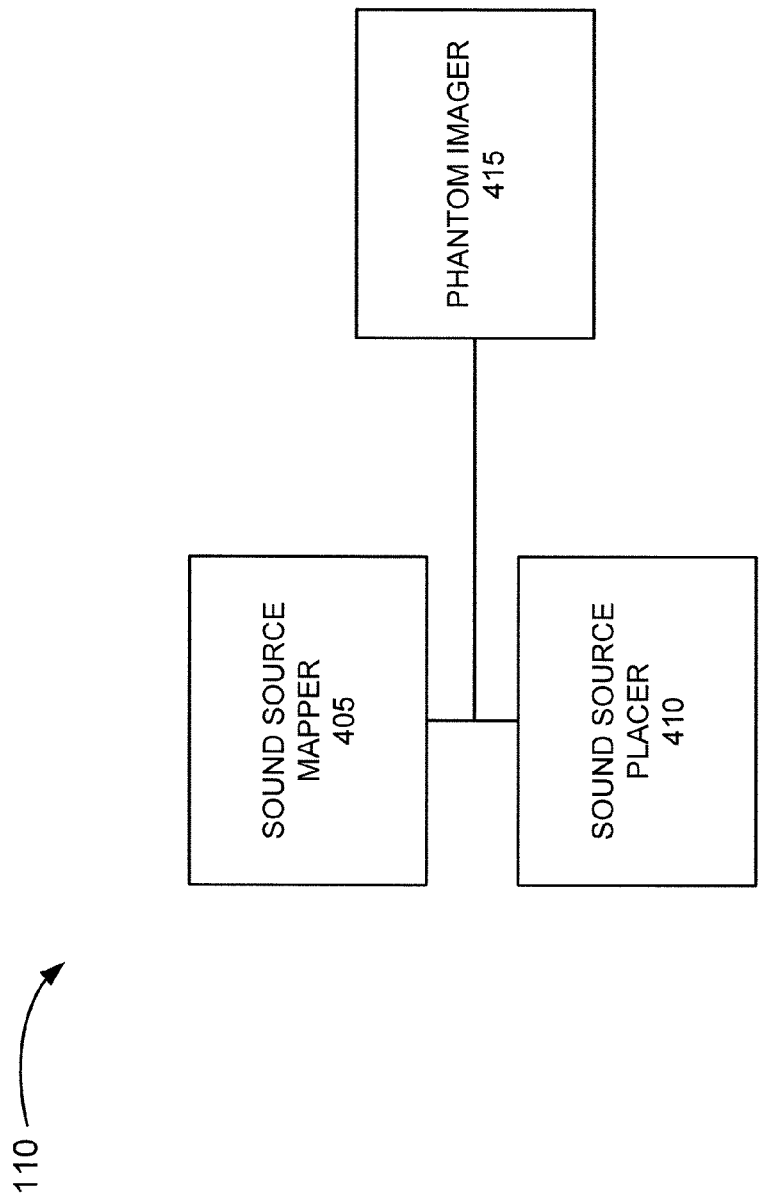
FIG. 4A is a diagram illustrating exemplary functional components of the user device depicted in FIG. 2.

FIG. 4A is a diagram illustrating exemplary functional components of user device 110. As illustrated, user device 110 may include a sound source mapper 405, a sound source placer 410, and a phantom imager 415. Each of these functional components may be implemented in hardware (e.g., processing system 305) or a combination of hardware and software (e.g., processing system 305 and applications 315). In an exemplary implementation, sound source mapper 405 and sound source placer 410 may be operatively connected to phantom imager 415. Other components of user device 110, such as, for example, communication interface 320, gesture detector 340, etc., may also be operatively connected to sound source mapper 405, sound source placer 410, and/or phantom imager 415.

Figure 4B:
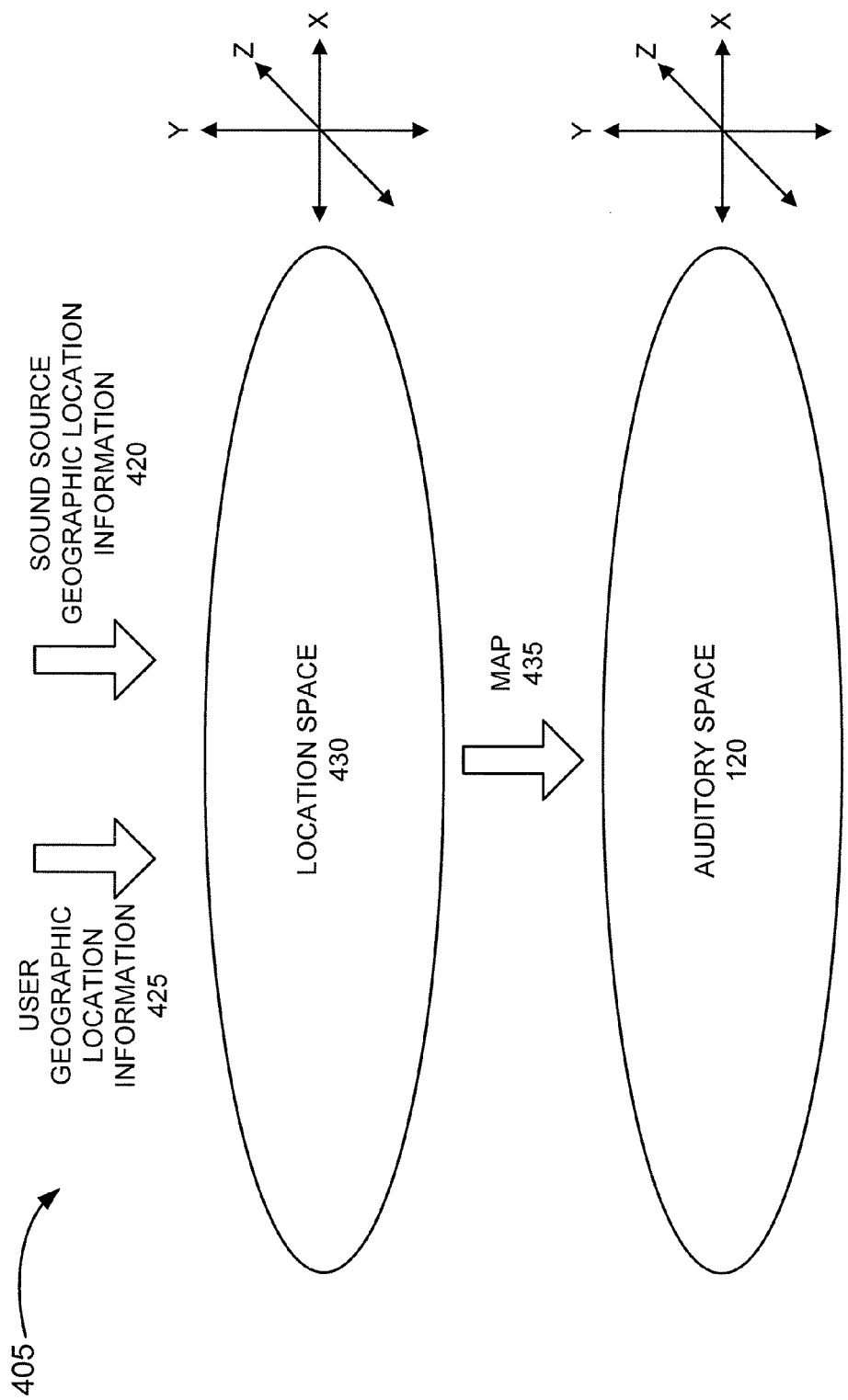
FIG. 4B is a diagram illustrating an exemplary process performed by a sound source mapper depicted in FIG. 4A.

Sound source mapper 405 may map a geographic location associated with a sound source to a location in auditory space 120. FIG. 4B is a diagram illustrating an exemplary process performed by sound source mapper 405. For example, as illustrated, sound source mapper 405 may receive sound source geographic location information 420 (e.g., of another user 105) and user geographic location information 425 (corresponding to user 105 operating user device 110). Depending on the technology or technique used to obtain the geographic location of the sound source and user geographic location information, sound source geographic location information 420 and user geographic location information 425 may include different types of geographic location information, such as, for example, longitude and latitude information (e.g., degrees, minutes, seconds) or some other type of geographic location information (e.g., geocodes, etc.). Sound source mapper 405 may identify locations in a location space 430 that correspond to the geographic location information associated with sound source geographic location information 420 and user geographic location information 425. Sound source mapper 405 may map 435 the geographic location associated with sound source geographic location information 420 in location space 430 to a corresponding location in auditory space 120.

In other implementations, sound source geographic location information 420 may be mapped 435 to auditory space 120 directly, without a mapping from location space 430 to auditory space 120. For example, the geographic location information may serve as a pointer to a corresponding location in auditory space 120.

Figure 4C:
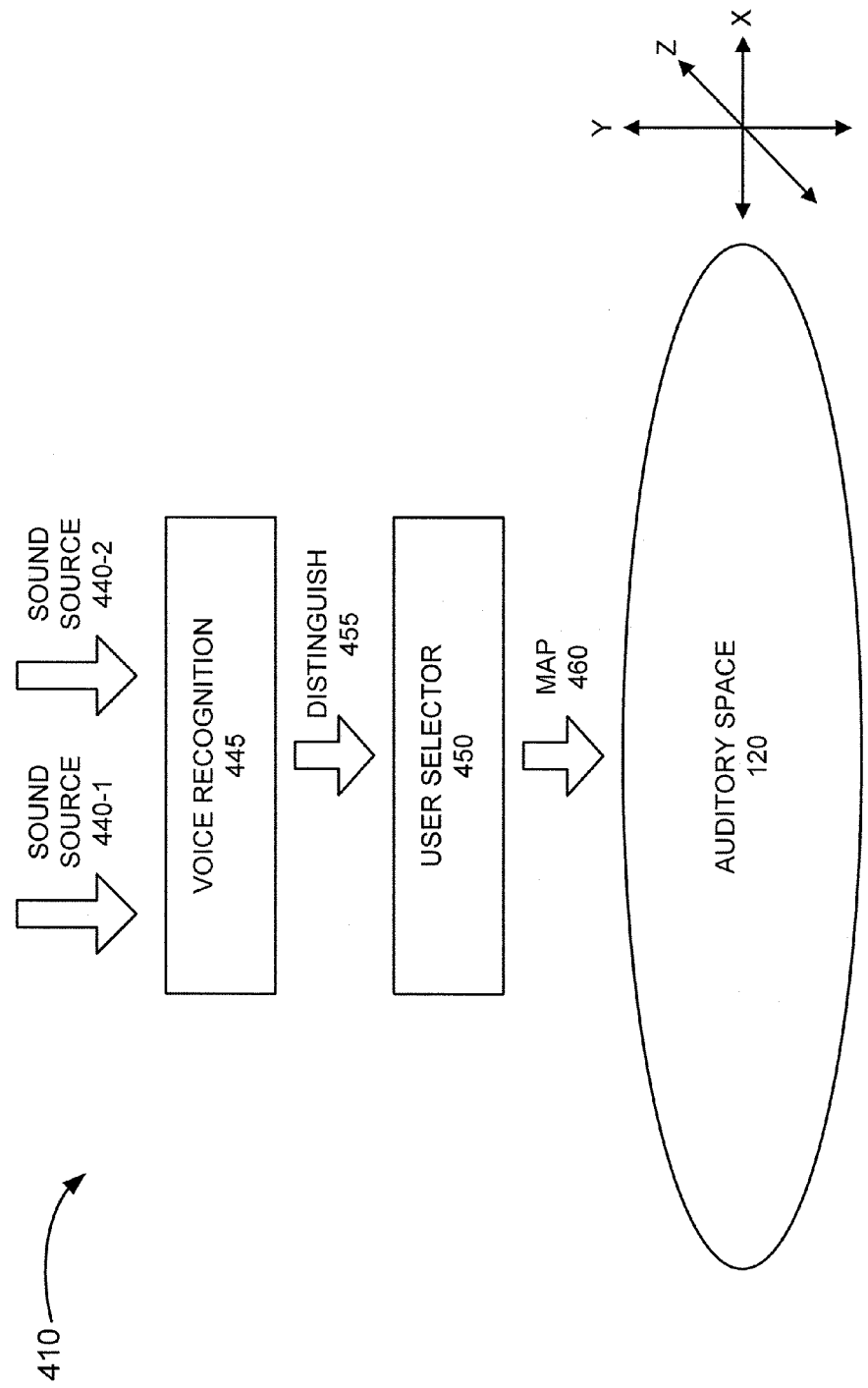
FIG. 4C is a diagram illustrating an exemplary process performed by a sound source placer depicted in FIG. 4A.

Sound source placer 410 may map a sound source to a location in auditory space 120. The location may be selected by user 105. FIG. 4C is a diagram illustrating an exemplary process performed by sound source placer 410. For example, as illustrated, sound source placer 410 may receive a sound source 440-1 and a sound source 440-2 (referred to generally as sound source(s) 440). Sound sources 440 may correspond to voices of other users during a telephone call. In one implementation, a voice recognition 445, which may be included in sound source placer 410 or operatively connected to sound source placer 410, may distinguish 455 sound sources 440. Sound source placer 410, or an input interface operatively connected to sound source placer 410, may permit user 105 to select a location in auditory space 120 to place the distinct sound sources 440. For example, a user selector 450 may permit user 105 to select the location in auditory space 120. User selector 450 may be implemented in various ways, such as, for example, a graphical user interface (GUI), based on gesture detector 340, and/or some other type of input 330. In the case of utilizing gesture detector 340, for example, user 105 may point user device 110 toward a location in which user 105 wishes sound source 440 to be placed in auditory space 120. Sound source placer 410 may also utilize geographic location information of user 105 and/or compass information associated with a direction in which user 105 is facing, to identify the location in which user 105 wishes to place sound source 440. As illustrated in FIG. 4C, sound source placer 410 may map 460 the location selected by user 105 (via user selector 450) to the corresponding location in auditory space 120.

Figure 4D:
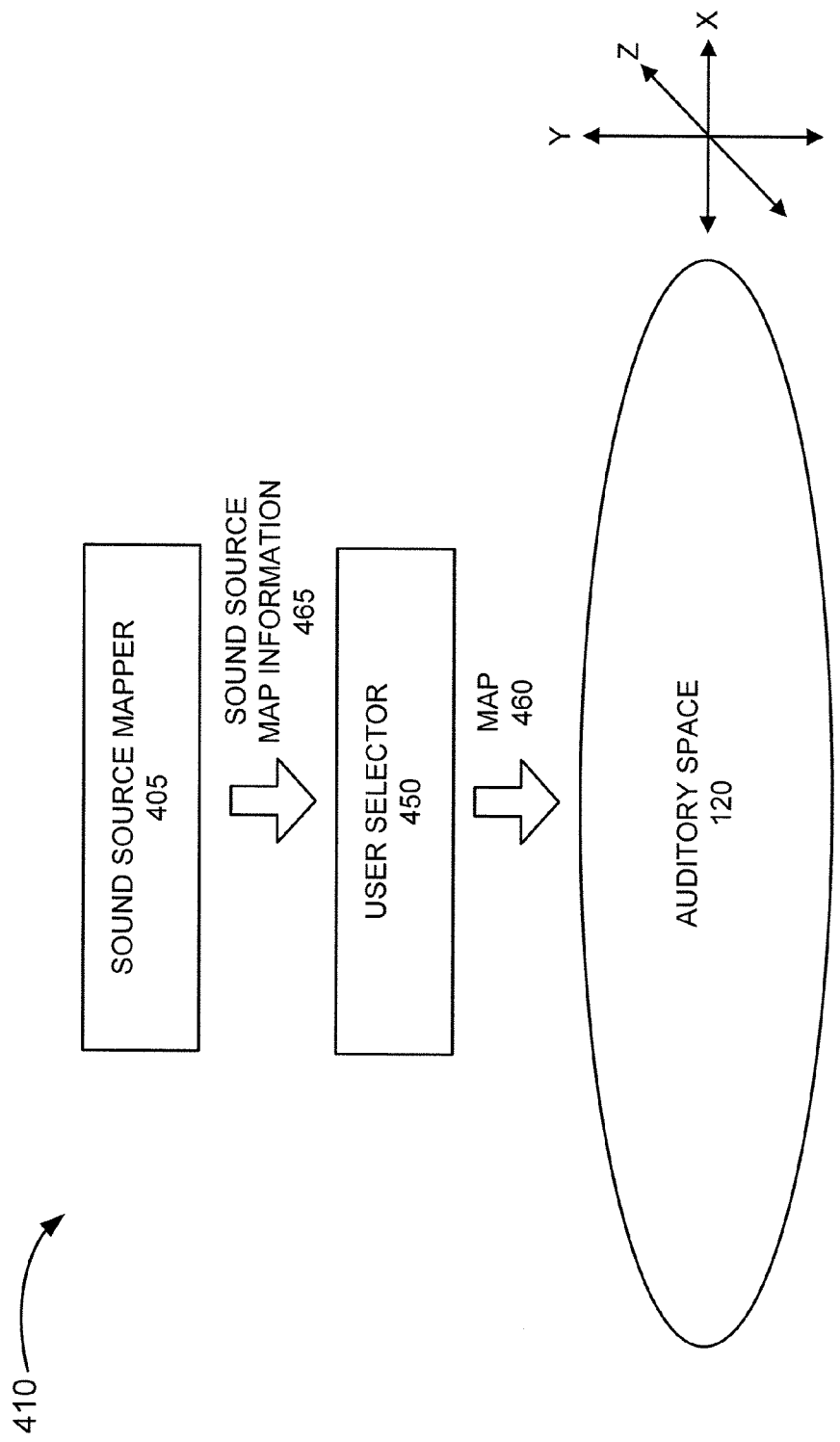
FIG. 4D is a diagram illustrating another exemplary process performed by the sound source placer depicted in FIG. 4A.

Additionally, or alternatively, sound source placer 410 may map a sound source to a location in auditory space 120 based on sound source mapper 405. FIG. 4D is a diagram illustrating another exemplary process performed by sound source placer 410. As illustrated, sound source mapper 405 may provide sound source map information 465 to user selector 450. In one implementation, sound source map information 465 may correspond locations in auditory space 120 based on the geographic locations of sound sources 440. For example, sound source placer 410 may receive locations in auditory space 120 associated with sound sources 440. User selector 450 may permit user 105 to move the location(s) or select different locations in auditory space 120 than the locations received from sound source mapper 405. Sound source placer 410 may map 460 the location(s) selected by user 105 (via user selector 450) to the corresponding location(s) in auditory space 120.

In another implementation, sound source map information 465 may include the geographic location information of sound sources 440. User selector 450 may permit user 105 to move the geographic location associated with sound source 440 to another geographic location. Sound source placer 410 may map 460 the geographic location moved by user 105 (via user selector 450) to the corresponding location in auditory space 120. In still another implementation, user selector 450 may permit user 105 to move the geographic location associated with sound source 440 to a location in auditory space 120.

Phantom imager 415 may process the sound received from a sound source so that that user 105 perceives the sound, via, for example, speaker 215 or headset 115, in the appropriate location in auditory space 120. For example, phantom imager 415 may select appropriate values relating to phase and amplitude differences between the sounds that will emanate from speakers 215 or headset 115 so that user 105 perceives the sound source in the appropriate location in auditory space 120. Phantom imager 415 may also utilize time delays in the transmission of the sound (e.g., the precedence effect or the Haas effect) so that user 105 perceives the sound source in the appropriate location in auditory space 120. Phantom imager 415 may receive the appropriate location in auditory space 120 from sound source mapper 405 or sound source placer 410.

Although FIGS. 4A-4D illustrate exemplary functional components, in other implementations, sound source mapper 405, sound source placer 410, and/or phantom imager 415 may include additional, fewer, or different components, or a different arrangement of components than those illustrated in FIGS. 4A-4D and described herein.

Exemplary Headset

Figure 5:
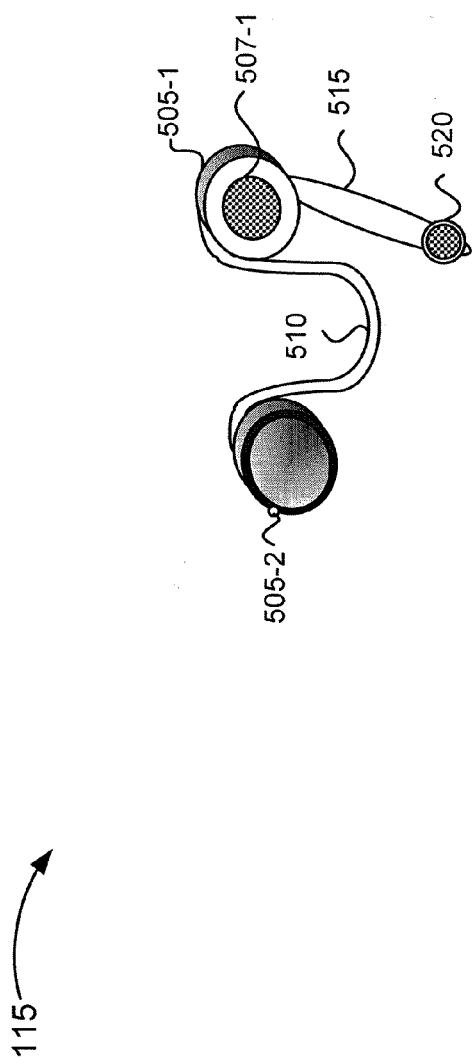
FIG. 5 is a diagram illustrating exemplary components of an exemplary headset.

FIG. 5 is a diagram illustrating exemplary components of an exemplary headset 115. As illustrated, headset 115 may include earpieces 505-1 and 505-2 (referred to generally as earpiece(s) 505), speakers 507, a headstrap 510, an extender 515, and a microphone 520. Although FIG. 5 illustrates exemplary components, in other implementations, fewer, additional, and/or different components, or a different arrangement of components than those illustrated in FIG. 5, and described herein, may be implemented. In one embodiment, headset 115 may be a wireless device (e.g., a Bluetooth-enabled device). In other embodiments, headset 115 may be a wired device.

Earpieces 505 may include a housing for one or more components. The housing may include, for example, plastic or metal, and may have an oval shape or another shape. For example, the size and shape of earpieces 505 may determine how user 105 uses earpieces 505. That is, an in-ear earpiece may be formed to be inserted into the ear canal of user 105. Alternatively, an in-concha earpiece may be formed to be inserted into the concha portion of an ear of user 105. Alternatively, a supra-aural earpiece or a circulum-aural earpiece may be formed to be worn on an outer portion of an ear of user 105 (e.g., to cover a portion of the outer ear or the entire ear). Each of earpieces 505-1 and 505-2 may include speakers 507-1 and 507-2, respectively, to emit sound.

Headstrap 510 may be made of leather or some other material, and may be contoured to permit user 105 to wear headset 115. Headstrap 510 may connect to earpieces 505.

Extender 515 may include a housing for one or more components. For example, extender 515 may include one or more buttons (e.g., an on/off button, a volume control button, a call/end button), a miniature display, and/or other components to perform, for example, digital echo reduction, noise cancellation, auto pairing, voice activation, etc. In some implementations, extender 515 may perform one or more operations associated with the processes described in relation to sound source mapper 405, sound source placer 410, and/or phantom imager 415.

Microphone 520 may include a component corresponding to that previously described above with respect to microphone 210.

As previously illustrated in FIGS. 1A and 1B, headset 115 may be worn by user 105. User 105 may hear other users 105, via headset 115, according to their respective locations in auditory space 120. In other embodiments, user device 110 may permit user 105 to hear other users 105, via speakers 215, according to their respective locations in auditory space 120. Headset 115 may include microphone 520 and/or user device 110 may include microphone 210 to permit user 105 to speak to other users 105. Additionally, as previously described, headset 115 may perform one or more of the processes associated with sound source mapper 405, sound source placer 410, and/or phantom imager 415.

Exemplary Process

Figure 6:
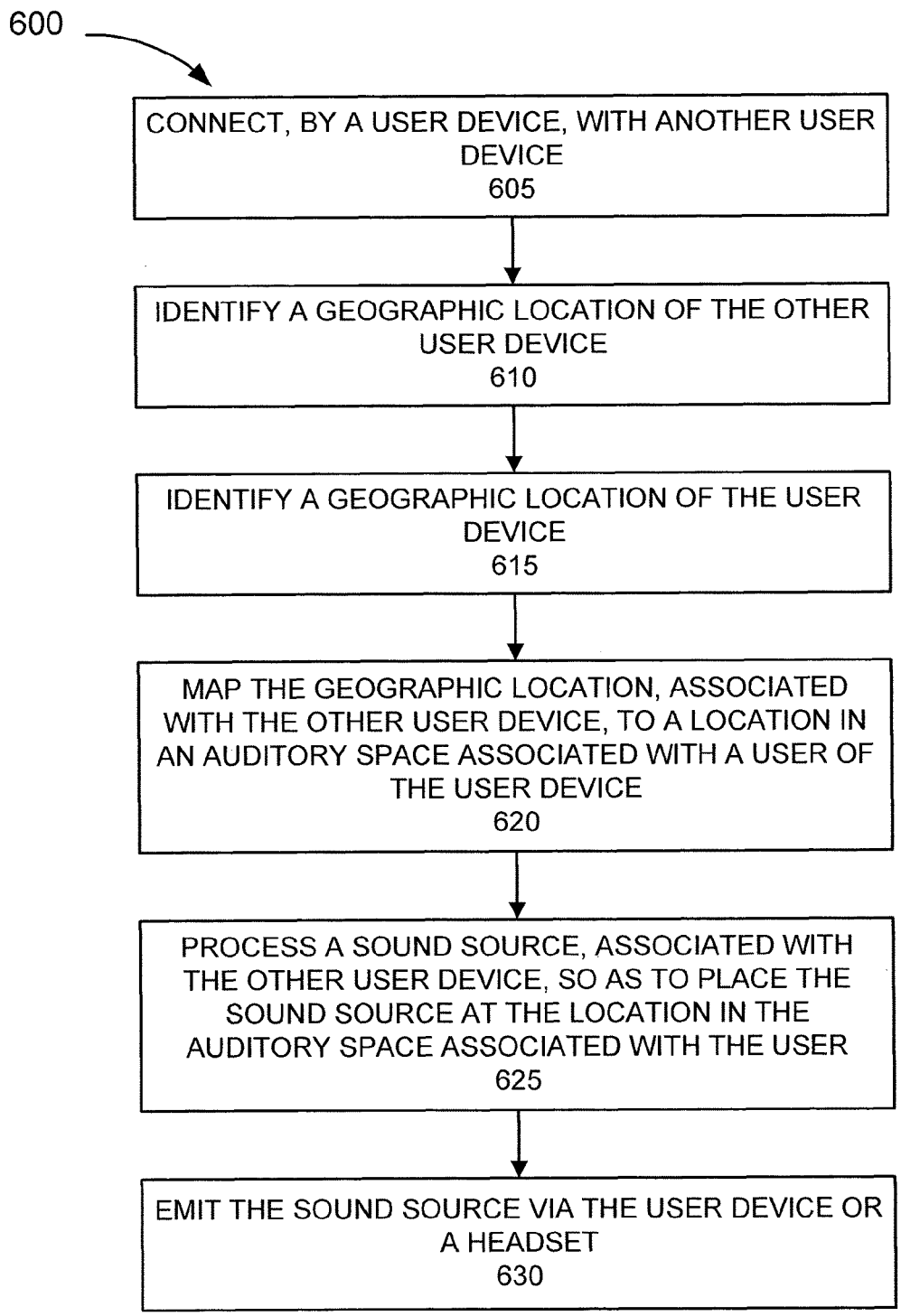
FIG. 6 is a flow diagram illustrating an exemplary process for providing auditory spacing of sound sources based on geographic locations of the sound sources.

FIG. 6 is a flow diagram illustrating an exemplary process 600 for providing auditory spacing of sound sources based on the geographic locations of the sound sources. Components of user device 110 described as performing a particular operation of process 600, may be performed by other components of user device 110, may be performed in combination with other components of user device 110, may be performed in combination with components in headset 115, and/or may be performed by headset 115.

Process 600 may begin with a user device connecting with another user device (block 605). For example, user device 110-1 may connect with another user device 110-2. The connection may be a result of user device 110-1 calling user device 110-2 or user device 110-2 calling user device 110-1. While process 600 will be described with respect to users 105-1 and 105-2 and user devices 110-1 and 110-2, additional users 105 and/or additional user devices 110 may exist.

A geographic location of the other user device may be identified (block 610). User device 110-1 may determine the geographic location of user device 110-2 based on various technologies or techniques. For example, GPS, triangulation, an IPS, or local positioning methods may be utilized to identify the geographic location of user device 110-2. The geographic location information may be provided to user device 110-1 so that the geographic location of user device 110-2 may be identified. Additionally, or alternatively, user device 110-1 may identify the geographic location of user device 110-2 based on an on-line service (e.g., Google Maps). Additionally, or alternatively, user device 110-1 may identify the geographic location of user device 110-2 based on a telephone number associated with user device 110-2. For example, a country code and/or an area code associated with the telephone number of user device 110-2 may used to identify the geographic location of user device 110-2. In one implementation, user device 110-1 may perform a lookup in a database stored in memory/storage 310. For example, the database may include associations between country codes, area codes, and/or other portions of a telephone number with geographic locations.

A geographic location of the user device may be identified (block 615). User device 110-1 may identify the geographic location of user device 110-1 based on various technologies or techniques. For example, GPS, triangulation, an IPS, or local positioning methods may be utilized to identify the geographic location of user device 110-1. Additionally, or alternatively, user device 110-1 may identify the geographic location of user device 110-1 based on an on-line service or based on the database.

The geographic location of the other user device may be mapped to a location in an auditory space associated with a user of the user device (block 620). For example, as previously described, sound source mapper 405 may map a geographic location associated with a sound source to a location in auditory space 120. In one embodiment, sound source mapper 405 may identify locations in a location space 430 based on the geographic locations associated with user devices 110-1 and 110-2. Sound source mapper 405 may map the location in location space 430, which is associated with user device 110-2, to auditory space 120. In another embodiment, sound source mapper 405 may map the geographic location associated with user device 110-2, without a mapping from location space 430, to a location in auditory space 120.

A sound source, associated with the other user device, may be processed so as to place the sound source at the location in the auditory space (block 625). For example, as previously described, phantom imager 415 may receive the location in auditory space 120 from sound source mapper 405. Based on the location in auditory space 120, phantom imager 415 may select appropriate values relating to phase, amplitude, time delays, etc., with respect to the sound source, so as to place the sound source in the location in auditory space 120. By way of example, phantom imager 415 may modify the phase or the amplitude relationship between the sound source being emitted from one speaker (e.g., speaker 215 of user device 110-1 or speaker 507-1 associated with earpiece 505-1 of headset 115) and another speaker (e.g., speaker 215 of user device 110-1 or speaker 507-2 associated with earpiece 505-2 of headset 115) so that user 105-1 perceives or localizes the sound source (e.g., the other user's 105-2 voice) in a particular location in auditory space 120.

The sound source may be emitted via the user device or a headset (block 630). Speakers 210 of user device 110-1 or speakers 507 associated with earpieces 505 of headset 115 may emit the sound source (e.g., the other user's 105-2 voice) from the location in the auditory space 120 of user 105-1.

Although FIG. 6 illustrates an exemplary process 600, in other implementations, process 600 may include fewer, different, and/or additional operations than those described. For example, the direction in which the user is facing may be identified and considered when mapping the geographic location associated with the other user device, to a location in the auditory space.

Exemplary Process

Figure 7:
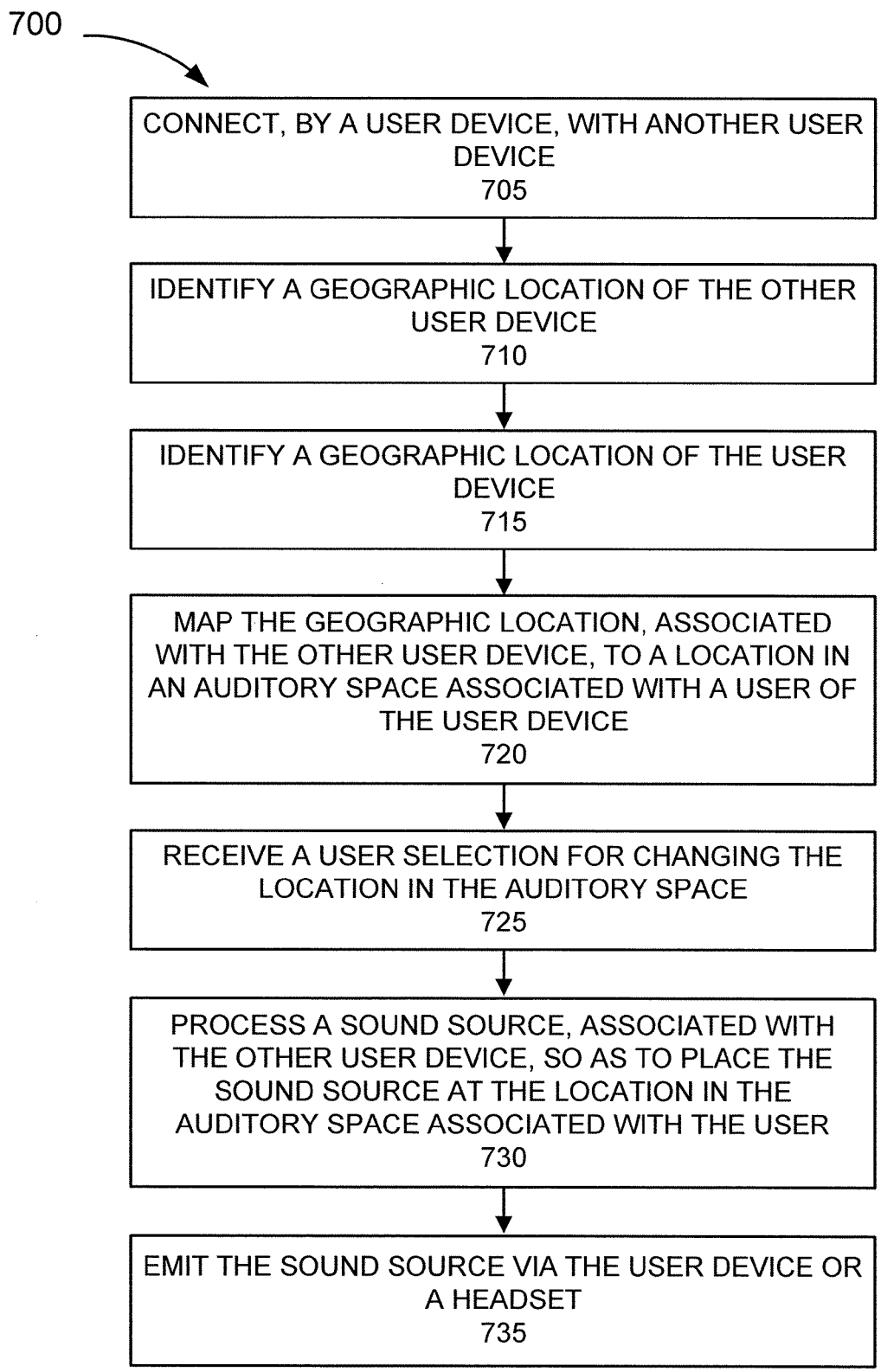
FIG. 7 is a flow diagram illustrating an exemplary process for providing auditory spacing of sound sources based on user placement.

FIG. 7 is a flow diagram illustrating an exemplary process 700 for providing auditory spacing of sound sources based on user placement. Components of user device 110 described as performing a particular operation of process 700, may be performed by other components of user device 110, may be performed in combination with other components of user device 110, may be performed in combination with components in headset 115, and/or may be performed by headset 115.

Process 700 may begin with a user device connecting with another user device (block 705). For example, user device 110-1 may connect with another user device 110-2. The connection may be a result of user device 110-1 calling user device 110-2 or user device 110-2 calling user device 110-1. While process 700 will be described with respect to users 105-1 and 105-2 and user devices 110-1 and 110-2, additional users 105 and/or additional user devices 110 may exist.

A geographic location of the other user device may be identified (block 710). User device 110-1 may determine the geographic location of user device 110-2 based on various technologies or techniques. For example, GPS, triangulation, an IPS, or local positioning methods may be utilized to identify the geographic location of user device 110-2. The geographic location information may be provided to user device 110-1 so that the geographic location of user device 110-2 may be identified. Additionally, or alternatively, user device 110-1 may identify the geographic location of user device 110-2 based on an on-line service (e.g., Google Maps). Additionally, or alternatively, user device 110-1 may identify the geographic location of user device 110-2 based on a telephone number associated with user device 110-2. For example, a country code and/or an area code associated with the telephone number of user device 110-2 may used to identify the geographic location of user device 110-2. In one implementation, user device 110-1 may perform a lookup in a database stored in memory/storage 310. For example, the database may include associations between country codes, area codes, and/or other portions of a telephone number with geographic locations.

A geographic location of the user device may be identified (block 715). User device 110-1 may identify the geographic location of user device 110-1 based on various technologies or techniques. For example, GPS, triangulation, an IPS, or local positioning methods may be utilized to identify the geographic location of user device 110-1. Additionally, or alternatively, user device 110-1 may identify the geographic location of user device 110-1 based on an on-line service or based on the database.

The geographic location of the other user device may be mapped to a location in an auditory space associated with a user of the user device (block 720). For example, as previously described, sound source mapper 405 may map a geographic location associated with a sound source to a location in auditory space 120. In one embodiment, sound source mapper 405 may identify locations in a location space 430 based on the geographic locations associated with user devices 110-1 and 110-2. Sound source mapper 405 may map the location in location space 430, which is associated with user device 110-2, to auditory space 120. In another embodiment, sound source mapper 405 may map the geographic location associated with user device 110-2, without a mapping from location space 430, to a location in auditory space 120.

A user selection for changing the location in the auditory space may be received (block 725). Sound source placer 410, or an input interface operatively connected to sound source placer 410, may receive a selection of a location in auditory space 120 that is different from the location in auditory space 120, which corresponds to the geographic location of user device 110-2. For example, in one implementation, the user selection may be received via a GUI displayed to user 105 via display 225. The GUI may permit user 105-1 to select the different location in various ways (e.g., moving icons, entering a location in a field or a prompt of the GUI via keypad 220, etc.). In another implementation, the user selection may be received based on gesture detector 340. For example, user 105-1 may point user device 110-1 in a direction corresponding to the location in auditory space 120 in which user 105-1 wishes the location of the sound source (e.g., the other user's 105-2 voice) to be placed. User 105-1 may, in addition to pointing user device 110-1, press a button or provide some other input (e.g., a gesture with user device 110-1), to indicate that the direction in which user device 110-1 is pointing, is the direction corresponding to the location in auditory space 120. In still other implementations, user device 110-1 may receive the user selection via another type of input 330.

A sound source, associated with the other user device, may be processed so as to place the sound source at the location in the auditory space (block 730). For example, as previously described, phantom imager 415 may receive the location in auditory space 120 from sound source placer 410. Based on the location in auditory space 120, phantom imager 415 may select appropriate values relating to phase, amplitude, time delays, etc., with respect to the sound source, so as to place the sound source in the location in auditory space 120. By way of example, phantom imager 415 may modify the phase or the amplitude relationship between the sound source being emitted from one speaker (e.g., speaker 215 of user device 110-1 or speaker 507-1 associated with earpiece 505-1 of headset 115) and another speaker (e.g., speaker 215 of user device 110-1 or speaker 507-2 associated with earpiece 505-2 of headset 115) so that user 105-1 perceives or localizes the sound source (e.g., the other user's 105-2 voice) in a particular location in auditory space 120.

The sound source may be emitted via the user device or a headset (block 735). Speakers 210 of user device 110-1 or speakers 507 associated with earpieces 505 of headset 115 may emit the sound source (e.g., the other user's 105-2 voice) from the location in the auditory space 120 of user 105-1.

Although FIG. 7 illustrates an exemplary process 700, in other implementations, process 700 may include fewer, different, and/or additional operations than those described. For example, the direction in which the user is facing may be identified and considered when mapping the geographic location associated with the other user device, to a location in the auditory space.

Exemplary Process

Figure 8:
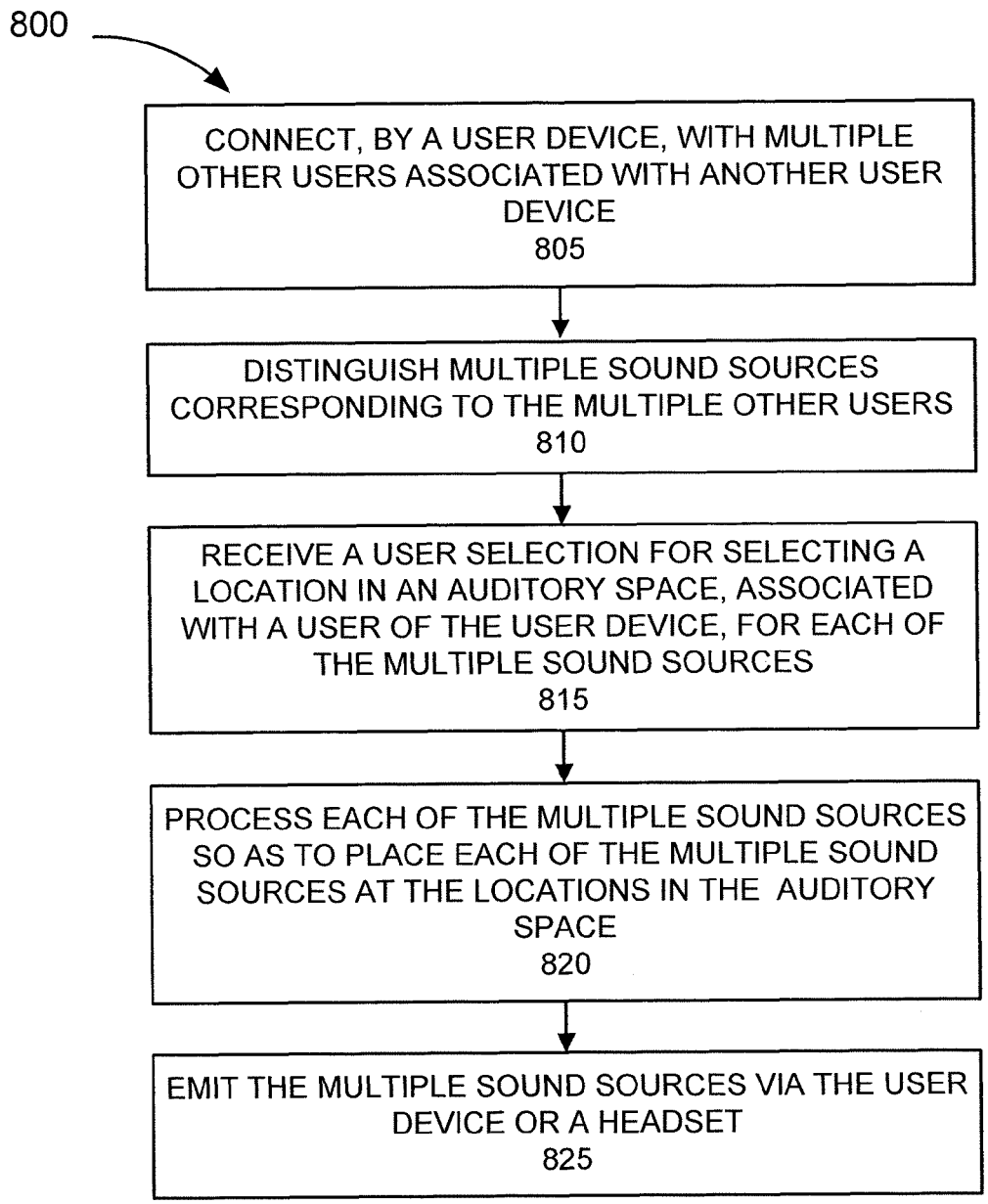
FIG. 8 is a flow diagram illustrating another exemplary process for providing auditory spacing of sound sources based on user placement.

FIG. 8 is a flow diagram illustrating an exemplary process 800 for providing auditory spacing of sound sources based on user placement. Components of user device 110 described as performing a particular operation of process 800, may be performed by other components of user device 110, may be performed in combination with other components of user device 110, may be performed in combination with components in headset 115, and/or may be performed by headset 115.

Process 800 may begin with a user device connecting with multiple users associated with another user device (block 805). For example, user device 110-1 may connect with another user device 110-2. The connection may be a result of user device 110-1 calling user device 110-2 or user device 110-2 calling user device 110-1. Multiple users 105 may be using user device 110-2 (e.g., in a conference call scenario).

While process 800 will be described with respect to users 105-1 and multiple users 105 using user devices 110-1 and 110-2, respectively, additional users 105 and/or additional user devices 110 may exist. Additionally, or alternatively, process 800 may be implemented when each of multiple users 105 are using their own user device 110.

Multiple sound sources corresponding to the multiple other users may be distinguished (block 810). For example, as previously described, voice recognition 445 may distinguish between the voices associated with the multiple users 105.

A user selection for selecting a location in an auditory space, associated with a user of the user device, for each of the multiple sound sources, may be received (block 815). Sound source placer 410, or an input interface operatively connected to sound source placer 410, may receive a selection of a location in auditory space 120. For example, in one implementation, the user selection may be received via a GUI displayed to user 105-1 via display 225. The GUI may permit user 105-1 to select the location in various ways (e.g., moving icons, entering a location in a field or a prompt of the GUI via keypad 220, etc.). In another implementation, the user selection may be received based on gesture detector 340. For example, user 105-1 may point user device 110-1 in a direction corresponding to the location in auditory space 120 in which user 105-1 wishes the location of the sound source (e.g., the other user's 105 voice) to be placed. User 105-1 may, in addition to pointing user device 110-1, press a button or provide some other input (e.g., a gesture with user device 110-1), to indicate that the direction in which user device 110-1 is pointing, is the direction corresponding to the location in auditory space 120. In still other implementations, user device 110-1 may receive the user selection via another type of input 330.

The multiple sound sources, associated with the other users, may be processed so as to place each of the multiple sound sources at the locations in the auditory space (block 820). For example, as previously described, phantom imager 415 may receive the locations in auditory space 120 from sound source placer 410. Based on the locations in auditory space 120, phantom imager 415 may select appropriate values relating to phase, amplitude, time delays, etc., with respect to each of the multiple sound sources, so as to place each of the multiple sound sources in the locations in auditory space 120. By way of example, phantom imager 415 may modify the phase or the amplitude relationship between the sound source being emitted from one speaker (e.g., speaker 215 of user device 110-1 or speaker 507-1 associated with earpiece 505-1 of headset 115) and another speaker (e.g., speaker 215 of user device 110-1 or speaker 507-2 associated with earpiece 505-2 of headset 115) so that user 105-1 perceives or localizes the sound source (e.g., one of the other user's 105 voice) in a particular location in auditory space 120.

The multiple sound sources may be emitted via the user device or a headset (block 825). Speakers 210 of user device 110-1 or speakers 507 associated with earpieces 505 of headset 115 may emit the multiple sound sources (e.g., the other users' 105 voices) from the locations in the auditory space 120 of user 105-1.

Although FIG. 8 illustrates an exemplary process 800, in other implementations, process 800 may include fewer, different, and/or additional operations than those described. For example, the direction in which the user is facing may be identified and considered when mapping the geographic location associated with the other user device, to a location in the auditory space.

Figure 9:
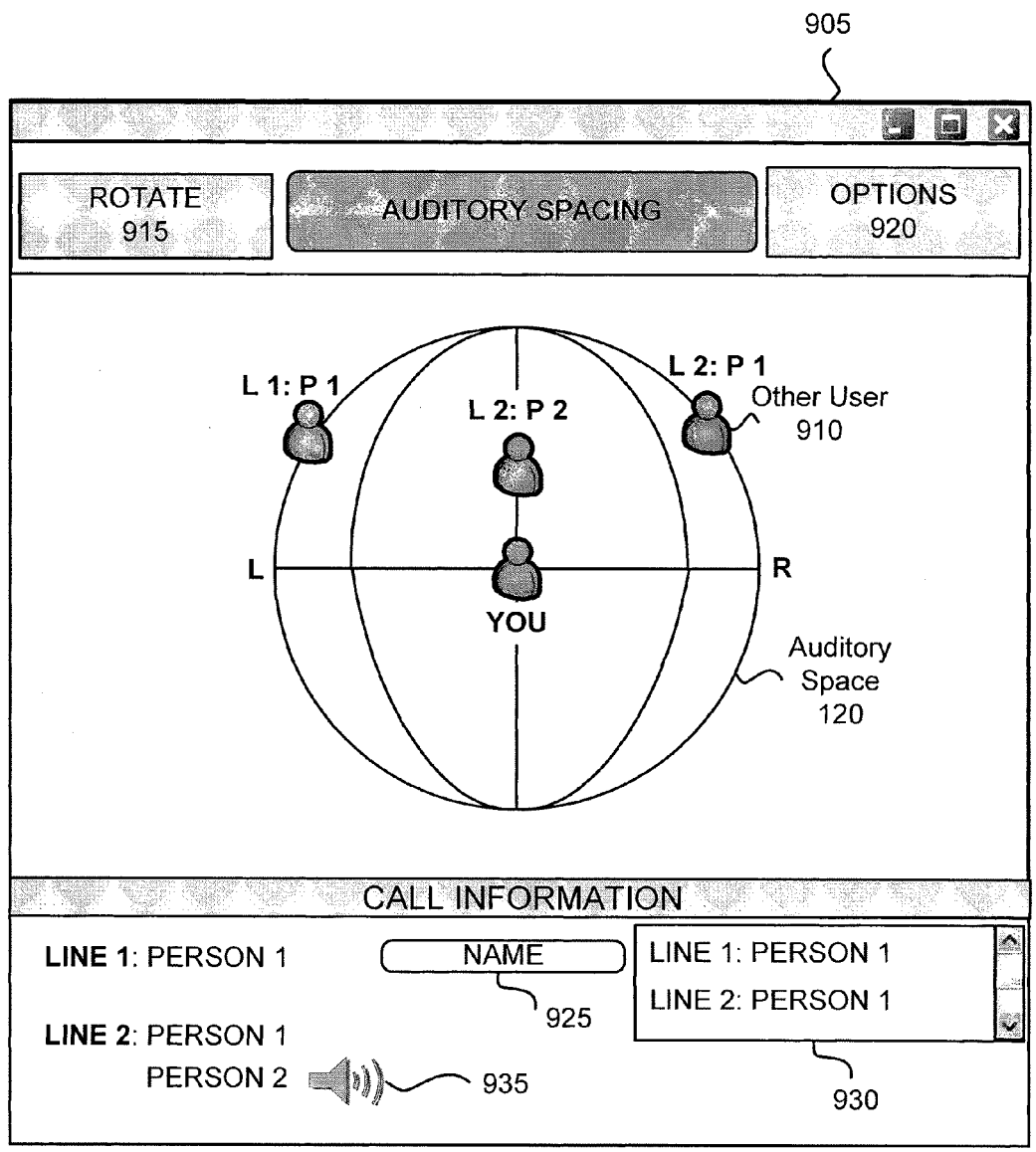
FIG. 9 is a diagram illustrating an exemplary user interface related to the auditory spacing of sound sources.

FIG. 9 is a diagram illustrating an exemplary user interface related to the spacing of sound sources. As illustrated, a GUI 905 may be presented to user 105 on display 225. GUI 905 may include a representation of auditory space 120. The representation of auditory space 120 may include other users 910 and their locations in auditory space 120, as well as user's 105 location in auditory space 120. Additionally, each other user 910 may include information that relates to call information (e.g., line 1: person 1, illustrated as L1: P1). In one implementation, user 105 may move other user 910 to a new location in auditory space 120 by dragging the graphical representation of other user 910 in auditory space 120. In another implementation, user 105 may move other user 910 by selecting other user 910 and pointing user device 110 in a particular direction, as previously described.

A rotate tab 915 may permit user 105 to rotate auditory space 120 so as to appreciate the two or three dimensionality of auditory space 120. Options tab 920 may permit user 105 to select various settings. For example, assume that user 105 is wearing headset 115 and user 105 selects a location in auditory space 120 for other user 910 to be on a right-side of user 105 in auditory space 120, or alternatively other user 910 is assigned to be on a right-side of user 105 in auditory space 120 based on a geographic location associated with other user 910. Options tab 920 may permit user 105 to either keep the location in auditory space 120 as static or not static. For example, when user 105 is facing a first direction and other user 910 is heard from a location to the right of user 105, and then user 105 turns (e.g., an about-face or 180 degrees), the location in auditory space 120 may remain to the right of user 105 or switch to the left of user 105 (i.e., since user 105 turned), depending on whether the location in auditory space 120 is static or not. This feature may also be implemented when user 105 is listening to other user 910 via speakers 215. For example, a direction in which user 105 is facing may be detected by user device 110. Depending on the preference selected via options tab 920, the location in auditory space 120 may be static or not.

As further illustrated, GUI 905 may include call information. The call information may identify particular call lines and whether one or more persons are on a particular call line. The call information interface may also permit user 105 to name a person on a particular line. For example, name label 925 may identify a name window 930 that permits user 105 to select a particular line and person. User 105 may name the selected person. Additionally, or alternatively, when user device 110 recognizes the telephone number (e.g., in a contact list), the name of the person may automatically be provided. Icon 935 may identify the person that is currently being emitted (or heard by user 105) via speakers 215 or 507.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

It should be emphasized that the term "comprises" or "comprising" when used in the specification is taken to specify the presence of stated features, integers, steps, or components but does not preclude the presence or addition of one or more other features, integers, steps, components, or groups thereof.

In addition, while series of blocks have been described with regard to processes illustrated in FIGS. 6, 7, and 8, the order of the blocks may be modified in other implementations. Further, non-dependent blocks may be performed in parallel. Further one or more blocks may be omitted.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" and "an" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

What is claimed is:

1. A method, comprising:
    connecting, by a first user device, to a second user device;
    identifying a geographic location of the second user device;
    identifying a geographic location of the first user device;
    mapping, by the first user device, a sound source associated with the second user device, based on the geographic location of the second user device with respect to the geographic location of the first user device, to a first location of an auditory space associated with a first user of the first user device;
    receiving input from a first user of the first user device, the input indicating that the first user has selected a second location of the auditory space for mapping the sound source associated with the second user device, the second location of the auditory space being different from the first location of the auditory space;
    re-mapping, by the first user device, the sound source associated with the second user device, based on the input received from the first user indicating that the first user has selected a second location of the auditory space different from the first location of the auditory space, to the second location of the auditory space associated with the first user; and
    emitting, based on the re-mapping the sound source associated with the second user device to the second location of the auditory space associated with the first user, the sound source so that the sound source is capable of being perceived by the first user in the second location of the auditory space.

2. The method of claim 1, where the sound source includes a second user's voice associated with the second user device.

3. The method of claim 1, further comprising:
    mapping the geographic location of the second user device to a first location of a location space;
    mapping the geographic location of the first user device to a second location of the location space; and
    mapping the sound source associated with the second user device, to the location in the auditory space, based on the second location of the location space with respect to the first location of the location space.

4. The method of claim 1, the placing comprising:
    selecting values related to one or more of a phase or an amplitude of the sound source to place the sound source in the location of the auditory space.

5. The method of claim 1, the identifying the geographic location of the second user device comprising:

identifying a telephone number associated with the second user device; and identifying the geographic location of the second user device based on the telephone number.

6. The method of claim 1, the receiving further comprising:

receiving the user input based on a pointing of the first user device in a direction that corresponds to the second location of the auditory space.

7. A user device, to:

connect to one or more other users associated with one or more other user devices;

distinguish one or more distinct sound sources each corresponding with the one or more other users based on voice recognition;

receive user input comprising a user selection of one or more locations of an auditory space, each of the one or more locations corresponding to one or more other users, wherein the auditory space is associated with a user of the user device;

place the voices of the one or more other users in the auditory space based on the user input comprising the selected one or more locations and without requiring further processing of the user input to determine the one or more locations of the auditory space; and emit the voices of the one or more other users via speakers based on the selected one or more locations of the auditory space.

8. The user device of claim 7, where the user device includes a wireless telephone.

9. The user device of claim 7, the user device is further to one of:

move the selected locations of the auditory space to a direction in which the user device is facing; or not move the selected locations of the auditory space regardless of the direction in which the user device is facing.

10. The user device of claim 7, the user device is further to:

connect to a headset that includes the speakers; and emit the voices of the other users via the speakers of the headset.

11. The user device of claim 7, where the user selection is based on a pointing of the user device in a direction that corresponds to the locations of the auditory space.

12. A user device, to:

connect with one or more other user devices;

identify one or more geographic locations of the one or more other user devices;

identify a geographic location of the user device;

map each sound source associated with the one or more other user devices, based on the one or more geographic locations of the one or more other user devices and the geographic location of the user device, to one or more first locations of an auditory space associated with a user of the user device;

receive input from the user of the user device, the input indicating that the user has selected one or more second locations of the auditory space for mapping each of the sound sources associated with the one or more other user devices, the one or more second locations of the auditory space being different from the one or more first locations of the auditory space;

re-map the one or more sound sources associated with the one or more other user devices, based on the input received from the user indicating that the user has selected one or more second locations of the auditory space different from the one or more first locations of the auditory space, to the one or more second locations of the auditory space associated with the user; and emit each sound source, via speakers, so that each sound source is capable of being perceived by the user in the selected one or more second locations of the auditory space.

13. The user device of claim 12, the user device is further to:

map the one or more geographic locations of the one or more other user devices to one or more locations in a location space;

map the geographic location of the user device to a location of the location space; and map each sound source associated with the one or more other user devices, to the one or more first locations of the auditory space, based on the one or more locations of the location space.

14. The user device of claim 12, where the user device connects with the one or more other user devices by placing a telephone call to the one or more other user devices, or by receiving a telephone call from the one or more other user devices.

15. The user device of claim 12, the user device is further to:

identify a direction in which the user is facing, and map each sound source associated with the one or more other user devices based on the direction in which the user is facing.

16. The user device of claim 12, further comprising a wireless telephone.

17. The user device of claim 12, the user device is further to:

select values related to one or more of a phase or an amplitude associated with each sound source to place each sound source in the one or more first locations of the auditory space.

18. The user device of claim 12, where each sound source comprises voices associated with the one or more other user devices.

* * * * *